United States Patent

Marten et al.

[15] 3,704,624

[45] Dec. 5, 1972

[54] VEHICLE TESTING APPARATUS AND TO SAFETY DEVICES THEREFORE

[72] Inventors: John Anthony Marten, Holt; Bernard Arthur Gee, Marham, both of England

[73] Assignee: Suntester Limited, King's Lynn, Norfolk, England

[22] Filed: April 7, 1971

[21] Appl. No.: 131,933

[30] Foreign Application Priority Data

April 10, 1970 Great Britain.....................17,247/70

[52] U.S. Cl..........................................73/117, 73/134
[51] Int. Cl.............................................G01l 5/13
[58] Field of Search.........................72/117, 134, 135

[56] References Cited

UNITED STATES PATENTS 3,453,874  7/1969  Cline.....................................73/135

2,982,128  5/1961  Gibson et al........................73/134 X

Primary Examiner—Jerry W. Myracle
Attorney—Molinare, Allegretti, Newitt & Witcoff

[57] ABSTRACT

The disclosure describes a safety device for a chassis dynamometer in which a signal representative of the speed of rotation of the dynamometer's rollers is processed to give a signal representative of the temperature of the tires of a vehicle being tested on the dynamometer. The signal is dependent on the time integral of $S^x$ where $x$ is approximately 3 and $S$ represents the speed of a dynamometer roller. When the temperature representative signal reaches a predetermined maximum safe value, an alarm is triggered.

11 Claims, 13 Drawing Figures

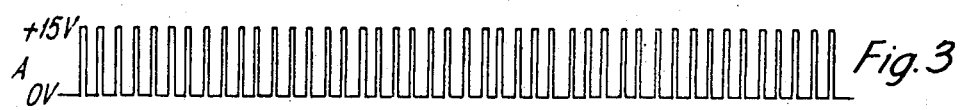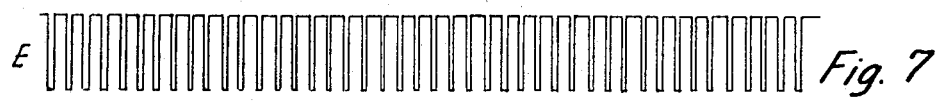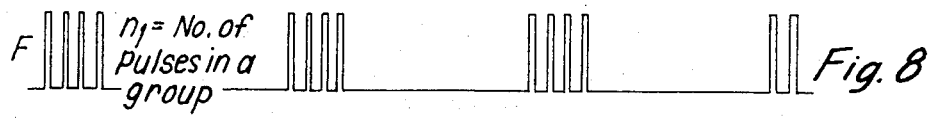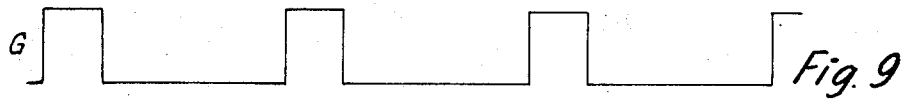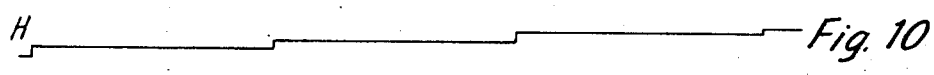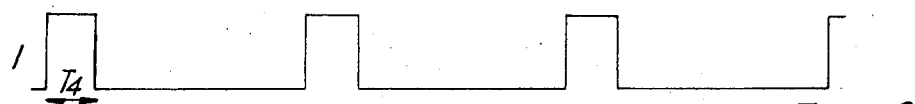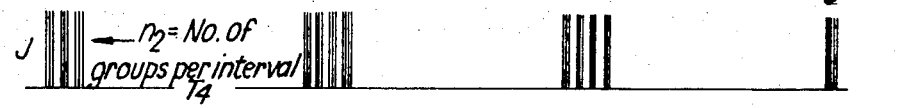

VEHICLE TESTING APPARATUS AND TO SAFETY DEVICES THEREFORE

RELATED APPLICATION

Applicants hereby claim priority under 35 U.S.C. 119 based on British Application No. 12747/70, filed Apr. 10, 1970 in Great Britain by their legal assignee, Suntester Limited, a British Company of Old Meadow Road, Harwick Industrial Estate, Kings Lynn, Norfolk.

BACKGROUND OF THE INVENTION

This invention relates to vehicle testing apparatus and is more specifically directed to safety devices therefor.

In order to test the performance of motor vehicles, other than by use on the road, it is usual to use some form of vehicle testing apparatus, such as a chassis dynamometer. Chassis dynamometers are used for measuring the tractive effort or power of motor driven vehicles and have at least one roller and preferably at least one pair of spaced parallel rollers for driving engagement with at least one traction wheel of the motor vehicle. Braking torque is supplied to at least one of the rollers by a device such as an eddy current brake. In order to manufacture such a dynamometer as inexpensively as possible, it is desirable that its rollers should be of small diameter. However, if the test is carried on for too long at high speeds, it has been found that small diameter rollers damage the tires of the traction wheels of vehicles being tested due to excessive internal heating of the tires. In order to avoid this damage, it has been usual to use larger diameter rollers than otherwise would be desirable.

SUMMARY OF THE INVENTION

It is an object of the invention to provide a safety device which will enable chassis dynamometers having smaller rollers than was usual hitherto to be used safely without damaging the driving wheel tires of the vehicle being tested.

In accordance with a principal feature of the invention, a safety device for a chassis dynamometer is provided wherein a speed representative signal dependent upon the speed of rotation S of one or more of the dynamometer's rollers is so processed as to produce a temperature representative signal dependent on the time integral of S where $x$ is a predetermined exponent of S. An output signal is provided if the magnitude of the integral exceeds a predetermined value. The output signal may conveniently be used to actuate a visible and/or audible alarm and/or to prevent further operation of the dynamometer.

Such a safety device must be calibrated for, or specially constructed for, a particular size of roller. In use, the device can be adjusted so that the signal dependent on the time integral of $S^x$ is substantially proportioned to the temperature of the vehicle's driving wheel tires. Thus, it will be appreciated that by suitably adjusting the device, an output signal can be obtained which will indicate that the tires of the vehicle being tested are approaching an excessively high temperature.

In order that the temperature representative signal should more accurately represent the temperature of the vehicle's driving wheel tires at all running speeds, a signal leakage path is preferably provided. The path is arranged so that the output signal is not generated unless the magnitude of the speed of rotation of the rollers is greater than a predetermined value.

According to another feature of the invention, the speed representative signal is digital, so that the speed of rotation of the roller or rollers is represented by the frequency of digital pulses.

In this case, preferably, the pulses are counted and a first intermediate signal having a fixed predetermined duration is generated for each group of a predetermined number of consecutive speed representative digital pulses. The first intermediate signals are counted, and a second intermediate signal having a predetermined duration is generated for each group of a predetermined number of the first intermediate signals. A terminal signal is generated each time there is coincidence between a speed representative digital pulse, a first intermediate signal, and a second intermediate signal. The terminal signal thus comprises a series of pulses whose mean frequency (taken over a period of time) is representative of $S^3$ and may be integrated by means of a counter. The counter may be arranged to provide an output signal when the number of pulses counted exceeds a predetermined value.

DESCRIPTION OF THE DRAWINGS

These and other objects, advantages and features of the invention will hereafter appear for purposes of illustration, but not of limitation, in connection with the accompanying drawings, wherein like numbers refer to like parts throughout, and wherein:

FIGS. 3–13 show electrical signal wave forms at various points in the circuit of FIG. 2.

DESCRIPTION OF THE PREFERRED EMBODIMENT

Figure 1:
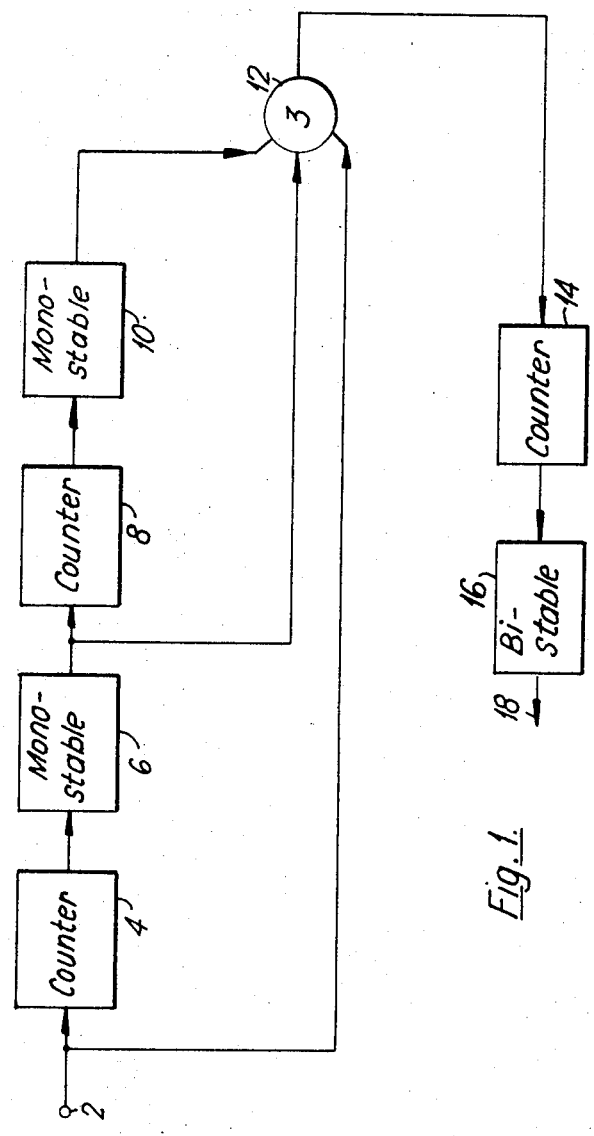
FIG. 1 is a block diagram of a safety device made in accordance with a preferred embodiment of the invention.

Referring to FIG. 1, a speed representative signal comprising a series of pulses whose frequency is dependent on the speed of rotation of the dynamometer's rollers is applied to an input terminal 2. The signal may for example be derived from a dynamometer of the kind described in our co-pending U.S. application Ser. No. 124,402 entitled "Improvements In And Relating To Vehicle Testing Apparatus", filed Mar. 15, 1971. The pulses are counted by a counter 4 which generates an output pulse for each group of a predetermined number of consecutive speed representative digital pulses. The output pulses of the counter 4 are shaped by a monostable circuit 6 which provides at its output a pulse of fixed magnitude and duration for each input pulse. The output signal of the monostable circuit 6 constitutes a first intermediate signal. The first intermediate signal pulses are counted by a counter 8, similar to the counter 4, which generates an output pulse for each group of a predetermined number of consecutive first intermediate signal pulses. The output pulses of the counter 8 are shaped by a monostable circuit 10 which generates an output pulse of fixed magnitude and duration for each output pulse from the counter 8. The output signal from the monostable circuit 10 constitutes a second intermediate signal.

The speed representative signal, the first intermediate signal, and the second intermediate signal are all fed to respective inputs of gating means 12 which comprises a three input AND gate and provides an output signal for the duration of coincidence between the pulses at its inputs. The mean value (taken over a suitable period of time) of the pulse rate of the output signal from the AND gate 12 is dependent on $S^3$ where S is the speed of rotation of the dynamometer's rollers.

The output signal from the AND gate 12 constitutes a terminal signal, and the pulses of the terminal signal are counted and thus integrated by a counter 14 to provide a temperature representative signal. When the temperature representative signal reaches a predetermined value, a bi-stable circuit 16 is caused to change its state. Thus, the output 18 of the bistable circuit 16 changes state when the time integral of $S^3$ exceeds a predetermined value.

Figure 2:
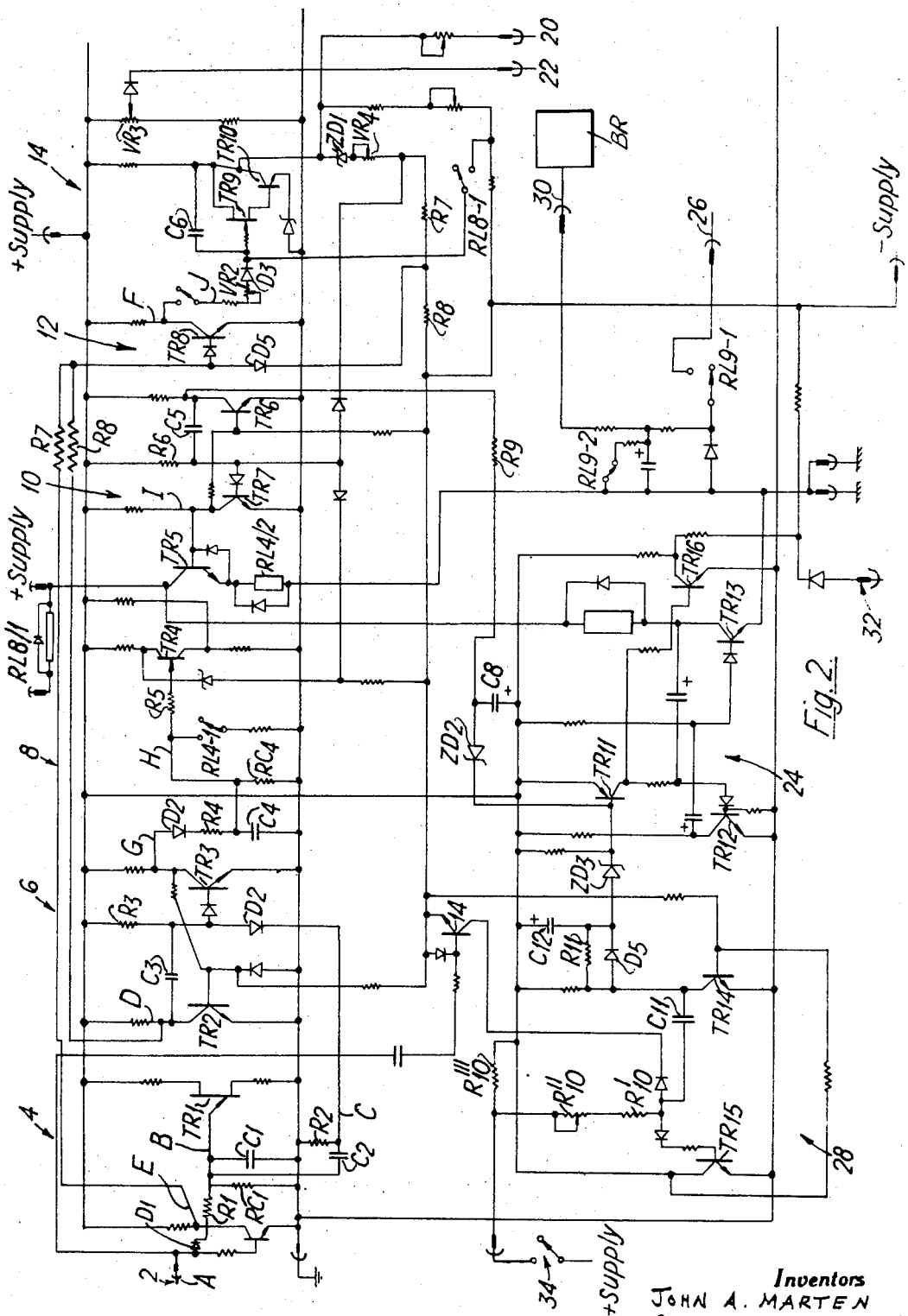
FIG. 2 is a more detailed schematic circuit diagram of the safety device shown in FIG. 1.

FIG. 2 is a detailed circuit drawing of the safety device shown in FIG. 1 and FIG. 3 shows wave forms at various points in the circuit of FIG. 2 which points are indicated by the reference letters A to J.

The counter 4 is a relaxation oscillator. A capacitor $C_1$ is charged by the speed representative signal pulses through a diode $D_1$ and a resistor $R_1$. A leakage path is provided by resistor $RC_1$ connected in parallel with the capacitor $C_1$. The junction between the resistor $R_1$ and the capacitor $C_1$ is connected to the emitter of a unijunction transistor $TR_1$ which is so biased as to conduct when the voltage across the capacitor $C_1$ reaches a predetermined value and thus provides a discharge path for capacitor $C_1$. Each time the capacitor $C_1$ discharges through the emitter of the uni-junction transistor $TR_1$, a negative going pulse is fed via a capacitor $C_2$, resistor $R_2$, and diode $D_2$ to the input of the monostable circuit 6 which comprises transistors $TR_2$ and $TR_3$, the duration of the output pulse being determined by a resistor $R_3$ and a capacitor $C_3$.

The output from the monostable circuit 6 is taken from the collector of the transistor $TR_3$ and is fed to the counter 8 which is also a relaxation oscillator. A capacitor $C_4$ is charged via a diode $D_2$ and a resistor $R_4$ by the output pulses from the monostable circuit 6. The capacitor $C_4$ has a leakage path through shunt resistor $RC_4$. The junction between the resistor $R_4$ and the capacitor $C_4$ is connected via a resistor $R_5$ to the gate of a field effect transistor $TR_4$. When the capacitor $C_4$ has been charged by the output pulses from the monostable circuit 6 to a predetermined voltage, the base of transistor $TR_4$ becomes so biased that the transistor conducts, thus providing a pulse which is fed to the base of a transistor $TR_7$ of the monostable circuit 10 which generates an output pulse. The length of the output pulse of the monostable circuit 10 is determined by a capacitor $C_5$ and a resistor $R_6$. The output of the monostable circuit 10 is taken from the collector of transistor $TR_7$ and is connected to a transistor $TR_5$ in emitter follower configuration which drives the coil of a relay RL4/2. One of the contacts RL4-1 of the relay RL4/2, which is normally open, is connected in parallel with the capacitor $C_4$ so that the counter 8 is reset at the beginning of an output pulse of the monostable circuit 10 so allowing the transistor $TR_7$ to be biased off at the end of the period determined by the resistor $R_6$ and the capacitor $C_5$. The counter 8 recommences counting at the end of the output pulse of the monostable circuit 10 when the relay contact RL4-1 opens.

The base of a transistor $TR_8$ is fed via a resistor $R_7$ with a signal which is an inversion of the speed representative signal applied to the input terminal 2. The base is also fed with the output signal from the monostable 6 via a resistor $R_8$. The resulting wave form at the collector of the transistor $TR_8$ is illustrated at F of FIG. 3. The signal at the collector of the transistor $TR_8$ is fed via a trimming resistor $VR_2$ and a relay contact RL4-2 of relay RL4 to the counter 14. The signal at J thus represents the product of the logical multiplication of the speed representative signal, the first intermediate signal and the second intermediate signal and is illustrated in FIG. 3 at J.

The counter 14 is a Miller integrator and comprises a transistor pair: $TR_9$ and $TR_{10}$, and a capacitor $C_6$ which is charged in accordance with the pulses arriving via diode $D_3$. An output signal is taken from the collector of transistor $TR_{10}$. This output signal appears across two terminals 20, 22, the latter being connected to the wiper of a potentiometer $VR_3$ to allow offset adjustment. The output signal is also fed via a potential dropping zener diode $ZD_1$ to a resistor chain $VR_4$, $R_7$ and $R_8$, by which the potential is divided and signals are fed via diodes $D_4$ and $D_5$ to the bases of the transistors $TR_7$ and $TR_8$ respectively.

The integrator is preset so that there is a large voltage across transistor $TR_{10}$ and so that the incoming pulses to the gate of transistor $TR_9$ progressively reduce the voltage across the transistor $TR_{10}$. When the collector voltage of the transistor $TR_{10}$—the output voltage of the integrator—has reduced sufficiently, transistors $TR_7$ and $TR_8$ are held off, transistor $TR_5$ is thus held on, and contact RL4-2 is thus closed, causing the integrator output to fall even further. The circuit thus latches in this condition. The integrator output voltage at which this latching occurs may be adjusted by means of the variable resistor $VR_4$.

The output of integrator 14 is representative of the temperature of the tires of a vehicle being tested on the dynamometer and is fed to a meter graduated from 0 to 100 percent to indicate how close to the maximum safe temperature the tire temperature is. The resistor $RC_1$ across capacitor $C_1$ allows for the situation that the vehicle may be tested indefinitely below a certain speed. The resistor $RC_4$ across capacitor $C_4$ adjusts the relationship between the input signal and output signal at terminals 20, 22 so that the output signal is dependent on the time integral of $S^{3.3}$, S being the speed of rotation of the rollers.

When the circuit latches at the occurrence of the maximum safe value for the tire temperature, the continuous signal at the collector of transistor $TR_6$, transmitted via smoothing circuit comprising resistor $R_9$ and capacitor $C_8$, is sufficient to switch on a transistor $TR_{11}$ via a zener diode $ZD_2$, thus enabling a multivibrator 24 to operate. The bistable multivibrator 24 comprises transistors $TR_{12}$ and $TR_{13}$, the collector load of the latter being a relay RL9/2.

Before the transistor $TR_{11}$ is switched on by the signal from the monostable 10, transistor $TR_{13}$ is biased on, its relay contacts RL9-1 being closed to provide a return circuit via terminal 26 to light an indicator lamp (not shown). When the transistor $TR_{11}$ is switched on, releasing the multivibrator 24, the contacts RL9-1 alternately open and close thus flashing the indicator lamp to indicate that the tire temperature has reached the maximum safe value.

The input pulse signal at terminal 2 is also fed to a transistor $TR_{14}$ which drives a monostable circuit 28 comprising transistors $TR_{15}$ and $TR_{16}$. The output of the monostable circuit 14 is taken from the collector of transistor $TR_{16}$ and the duration of the output pulses is determined by capacitor $C_9$ and resistors $R'_{10}$, $R''_{10}$ and $R'''_{10}$ or $R'_{10}$ and $R''_{10}$ (depending on whether a switch 34 is open or closed). The output signal is smoothed by resistor $R_{11}$, diode $D_5$ and capacitor $C_{17}$. When the speed of rotation of the dynamometer's rollers reaches a predetermined value—set by the switch 34—transistor $TR_{16}$ remains continuously on and capacitor $C_{12}$ charges sufficiently to switch on transistor $TR_{11}$ via zener diode $ZD_3$. Transistor $TR_{11}$ releases the multivibrator 24 and thus flashing the indicator lamp to indicate an excessive speed of rotation of the rollers. The speed at which the transistor $TR_{16}$ remains continuously on and depends on the duration of the pulses which may be adjusted by opening or closing a switch 34 so that the maximum speed limit may be set to correspond either to radial or cross-ply tires.

When the relay RL9/2 is operating—flashing the indicator lamp—either due to an excessive speed signal or to an excessive temperature signal from the integrator 14, the signal level at an output terminal 30 falls. This fall in signal level is used to operate a brake BR to brake the dynamometer to rest. For example, the signal may actuate a circuit such as that described in our copending U.S. application Ser. No. 128,995 entitled "-Vehicle Testing Apparatus" filed on or about Mar. 27, 1971, to bring the dynamometer to rest at a controlled rapid deceleration.

Should the indicator lamp fall, the signal level at terminal 30 also falls, and the dynamometer's rollers are thus brought to rest until the indicator lamp is replaced.

The circuit may be re-set by momentarily energizing relay RL8/1 which causes contacts RL8-1 to close resetting the integrator 14 with a large voltage across the transistor $TR_{10}$ and thus releasing transistors $TR_7$ and $TR_8$ from their continuous off condition.

The relay RL8 is preferably operated only by completion of a sequence ensuring that the vehicle being tested is driven off of the dynamometer—for example bringing the rollers to rest, substantially locking them, and driving the vehicle against the braked roller, which would cause the vehicle to drive out.

As an additional safety feature, to ensure that the dynamometer is unusable in the event of an alarm condition, when transistor $TR_{11}$ is on, a signal is generated by a transistor $TR_{16}$ at an output terminal 32, which signal is used to swamp the meter indicating the power output of the vehicle being tested so as to give a full scale deflection.

What we claim is:

1. In a chassis dynamometer having at least one roller adapted to be rotated by a source of power, improved safety apparatus comprising:
    means for generating a speed representative signal S that is proportional to the speed of rotation of the roller;
    means for processing the speed representative signal to produce a temperature representative signal dependent on the time integral of $S^x$ where $x$ is a predetermined exponent of the speed representative signal S; and
    means for producing an output signal when the temperature representative signal exceeds a predetermined value.

2. Apparatus, as claimed in claim 1, wherein the predetermined exponent $x$ is about 3.

3. Apparatus, as claimed in claim 1, wherein the output signal energizes means for inhibiting further operation of the dynamometer.

4. Apparatus, as claimed in claim 1, and further comprising means for preventing the generation of an output signal unless the magnitude of the speed representative signal is greater than a predetermined value.

5. Apparatus, as claimed in claim 1, wherein the means for generating comprises means for generating digital pulses having a frequency proportional to the speed of the roller.

6. Apparatus, as claimed in claim 5, wherein the means for processing comprises:
    means for counting the digital pulses;
    means for generating a first intermediate signal having a predetermined duration in response to each group of a predetermined number of consecutive digital pulses;
    means for counting the first intermediate signals;
    means for generating a second intermediate signal having a predetermined duration in response to each group of a predetermined number of first intermediate signals; and
    means for generating a terminal signal each time there is coincidence between a digital pulse, a first intermediate signal and a second intermediate signal.

7. Apparatus, as claimed in claim 6, wherein each of the means for counting is a relaxation oscillator comprising a serially connected diode, a resistor and a capacitor with discharge means for the capacitor, the arrangement being such as to discharge the capacitor when the voltage stored thereon reaches a predetermined value.

8. Apparatus, as claimed in claim 7, wherein the capacitor of the means for counting the digital pulses is provided with a parallel leakage resistor so that the output signal is not generated unless the frequency of the digital pulses is greater than a predetermined value.

9. Apparatus, as claimed in claim 7, wherein the capacitor of the means for counting the first intermediate signals is provided with a parallel leakage resistor, so that $x$ is approximately 3.3.

10. Apparatus, as claimed in claim 6, wherein the means for processing further comprises counting means for counting the terminal signals over a predetermined time period to produce the temperature representative signal.

11. Apparatus, as claimed in claim 1, wherein the means for processing comprises:
    means for producing a terminal signal having a value proportional to $S^x$; and
    means for integrating the terminal signal over a predetermined time period.

* * * * *